United States Patent
Yang

(10) Patent No.: US 11,182,867 B2
(45) Date of Patent: *Nov. 23, 2021

(54) METHOD AND SYSTEM OF STORING RECORD OF COPYRIGHT EVENT BASED ON BLOCKCHAIN

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/079,372

(22) Filed: Oct. 23, 2020

(65) Prior Publication Data

US 2021/0110493 A1 Apr. 15, 2021

Related U.S. Application Data

(63) Continuation of application No. PCT/CN2019/099040, filed on Aug. 2, 2019.

(30) Foreign Application Priority Data

Sep. 14, 2018 (CN) .......................... 201811076662.1

(51) Int. Cl.
- *G06Q 50/18* (2012.01)
- *G06F 16/27* (2019.01)
- *H04L 9/06* (2006.01)

(52) U.S. Cl.
CPC .......... *G06Q 50/184* (2013.01); *G06F 16/27* (2019.01); *H04L 9/0643* (2013.01); *H04L 2209/38* (2013.01)

(58) Field of Classification Search
None
See application file for complete search history.

(56) References Cited

U.S. PATENT DOCUMENTS 10,121,025 B1 * 11/2018 Rice ..................... G06F 21/10
10,740,733 B2 8/2020 Moir et al.
(Continued)

FOREIGN PATENT DOCUMENTS

CA 3019267 A1 11/2017
CN 106779805 A 5/2017
(Continued)

OTHER PUBLICATIONS

Xu et al., "Design of Network Media's Digital Rights Management Scheme Based on Blockchain Technology," IEEE 13th International Symposium on Autonomous Decentralized Systems, pp. 128-133, 2017.

(Continued)

*Primary Examiner* — Sarah M Monfeldt
*Assistant Examiner* — Michael J. Monaghan
(74) *Attorney, Agent, or Firm* — Seed IP Law Group LLP

(57) ABSTRACT

Disclosed are a method and system of storing a record of a copyright event based on a blockchain. Devices of some work service providers operating work-related services can serve as member nodes to form a consortium blockchain network. Each work service provider broadcasts copyright events generated based on its work-related services to the consortium blockchain network, so all the work service providers perform blockchain-based distributed storage.

20 Claims, 5 Drawing Sheets

(56) References Cited

U.S. PATENT DOCUMENTS

| | | | |
|---|---|---|---|
| 2017/0116693 A1 | 4/2017 | Rae et al. | |
| 2017/0206523 A1 | 7/2017 | Goeringer et al. | |
| 2017/0279783 A1 | 9/2017 | Milazzo et al. | |
| 2018/0041571 A1* | 2/2018 | Rogers | H04L 67/22 |
| 2018/0068091 A1 | 3/2018 | Gaidar et al. | |
| 2018/0232828 A1 | 8/2018 | Joao | |
| 2018/0285996 A1 | 10/2018 | Ma | |
| 2018/0374173 A1 | 12/2018 | Chen et al. | |
| 2019/0036710 A1* | 1/2019 | Qiu | H04L 9/006 |
| 2019/0155997 A1 | 5/2019 | Vos et al. | |
| 2019/0188711 A1 | 6/2019 | Wu et al. | |
| 2019/0251648 A1 | 8/2019 | Liu et al. | |
| 2019/0303893 A1 | 10/2019 | Ramasamy et al. | |
| 2019/0306230 A1 | 10/2019 | Purushothaman et al. | |
| 2019/0318348 A1 | 10/2019 | Brenner et al. | |
| 2019/0327080 A1* | 10/2019 | Liu | H04L 9/0637 |
| 2019/0354723 A1* | 11/2019 | Dassenno | H04L 63/126 |
| 2020/0012765 A1 | 1/2020 | Smaiely et al. | |
| 2020/0067696 A1 | 2/2020 | Sarin | |
| 2020/0082361 A1 | 3/2020 | Chan et al. | |
| 2020/0111082 A1 | 4/2020 | Wu | |
| 2020/0134586 A1 | 4/2020 | Wu et al. | |
| 2020/0160466 A1 | 5/2020 | Hori | |
| 2020/0171750 A1 | 6/2020 | Beckmann et al. | |
| 2020/0202467 A1 | 6/2020 | Salvo et al. | |
| 2020/0294046 A1 | 9/2020 | Wu et al. | |

FOREIGN PATENT DOCUMENTS

| | | | | |
|---|---|---|---|---|
| CN | 106878000 A | | 6/2017 | |
| CN | 107145768 A | * | 9/2017 | H04L 9/0637 |
| CN | 107145768 A | | 9/2017 | |
| CN | 107169325 A | | 9/2017 | |
| CN | 107171785 A | | 9/2017 | |
| CN | 107222303 A | | 9/2017 | |
| CN | 107330694 A | | 11/2017 | |
| CN | 107508680 A | | 12/2017 | |
| CN | 107659610 A | | 2/2018 | |
| CN | 107784604 A | | 3/2018 | |
| CN | 108334753 A | | 7/2018 | |
| CN | 108389059 A | | 8/2018 | |
| CN | 108510412 A | | 9/2018 | |
| CN | 108520462 A | | 9/2018 | |
| CN | 109272385 A | | 1/2019 | |
| CN | 109274667 A | | 1/2019 | |
| CN | 109391480 A | | 2/2019 | |
| JP | 6340107 B1 | | 6/2018 | |
| KR | 10-1897032 B1 | | 9/2018 | |
| TW | M561279 U | | 6/2018 | |

OTHER PUBLICATIONS

Zeng et al., "A Solution to Digital Image Copyright Registration Based on Consortium Blockchain," Springer Nature Singapore Pte Ltd. vol. 875, pp. 228-237, 2018.

Ma et al., "A Master-Slave Blockchain Paradigm And Application In Digital Rights Management," China Communications, 15(8): 174-188, 2018.

Ma et al., "Secure DRM Scheme Based on Blockchain With High Credibility," Chinese Journal of Electronics. 27(5): 1025-1036, 2018.

Ma et al., "Blockchain For Digital Rights Management," Future Generation Computer Systems. 89(0167-739X):746-764, 2018.

Zhao et al., "BMCProtector: A Blockchain and Smart Contract Based Application for Music Copyright Protection," *ICBTA* 2018, Association for Computing Machinery.

* cited by examiner

METHOD AND SYSTEM OF STORING RECORD OF COPYRIGHT EVENT BASED ON BLOCKCHAIN

TECHNICAL FIELD

Implementations of the present specification relate to the field of information technology, and particularly, to a method and system of storing a record of a copyright event based on a blockchain.

BACKGROUND

At present, some providers of work-related services in the market further provide copyright event record-storing service to registered users. The copyright event record-storing service refers to the timely recording of a generated copyright event and the endorsement of the authenticity of the copyright event.

For example, music platform A operates music work-related services (such as allowing users to share original music works/adapted music works, allowing users to pay for music works online). In addition, usually music platform A provides record-storing services for copyright events generated based on the music work-related services. Specifically, user A of music platform A can upload music work X created by user A to music platform A at 12:00 on Sep. 1, 2018, and the server of music platform A stores the copyright event "User A created music work X at 12:00 on Sep. 1, 2018". User A can also sell the copyright of music work X held by user A to user B through music platform A at 12:00 on Sep. 2, 2018, and the server of music platform A records the copyright event "User A sold the copyright of music work X to user B at 12:00 on Sep. 2, 2018.

However, it is easy to tamper with or destroy a storage record obtained by a certain work service provider in respect of a copyright event.

SUMMARY

Implementations of the present specification provide a method and system of storing a record of a copyright event based on a blockchain. Some example technical solutions are as follows:

According to a first aspect of the implementations of the present specification, a method of storing a record of a copyright event based on a blockchain is provided, a consortium blockchain network of the blockchain including a plurality of member nodes, and the method includes: receiving, by a target member node, a request for storing a record for a target copyright event, the target copyright event being generated based on a work-related service of the target member node, and the work-related service of the target member node being a work-related service performed by a server of a work service provider that controls the target member node; constructing a transaction related to the target copyright event based on the request; and broadcasting the transaction to the consortium blockchain network for each member node to add the copyright event-related transaction to the blockchain based on a consensus mechanism.

According to a second aspect of the implementations of the present specification, an apparatus of storing a record of a copyright event based on a blockchain is provided, a consortium blockchain network consists of several member nodes, the apparatus is any member node, and the apparatus includes: a receiving module, configured to receive a request for storing a record for a target copyright event, the target copyright event being generated based on a work-related service of the target member node, and the work-related service of the target member node being a work-related service performed by a server of a work service provider that controls the target member node; a transaction construction module, configured to construct a transaction related to the target copyright event based on the request; and a broadcasting module, configured to broadcast the transaction to the consortium blockchain network for each member node to add the copyright event-related transaction to the blockchain based on a consensus mechanism.

According to a third aspect of the implementations of the present specification, a system of storing a record of a copyright event based on a blockchain is provided and includes a consortium blockchain network which consists of several member nodes; a target member node receives a request for storing a record for a target copyright event, the target copyright event being generated based on a work-related service of the target member node, and the work-related service of the target member node being a work-related service performed by a server of a work service provider that controls the target member node; constructs a transaction related to the target copyright event based on the request; and broadcasts the transaction to the consortium blockchain network; and each member node adds the copyright event-related transaction to the blockchain based on a consensus mechanism.

According to a fourth aspect of the implementations of the present specification, a computer device is provided. The computer device includes a memory, a processor, and a computer program that is stored in the memory and that can run on the processor. When executing the program, the processor implements the method of storing a record of a copyright event based on a blockchain.

According to the technical solutions provided in the implementations of the present specification, devices of some work service providers operating work-related services can serve as member nodes to form a consortium blockchain network. Each work service provider broadcasts copyright events generated based on its work-related services to the consortium blockchain network, so all the work service providers perform blockchain-based distributed storage. Because data on the blockchain cannot be tampered with or destroyed, the security and credibility of a storage record obtained after a copyright event is stored can be ensured after the storage record is added to the blockchain.

It should be understood that the general descriptions above and the detailed descriptions below are merely examples and illustrative, and cannot limit the implementations of the present specification.

In addition, any one of the implementations of the present specification does not need to achieve all the effects above.

BRIEF DESCRIPTION OF DRAWINGS

To describe the technical solutions in the implementations of the present specification or in the existing technologies more clearly, the following briefly describes the accompanying drawings needed for describing the implementations or the existing technologies. Clearly, the accompanying drawings in the following descriptions merely show some implementations of the present specification, and a person of ordinary skill in the art can still derive other drawings from these accompanying drawings.

DESCRIPTION OF IMPLEMENTATIONS

Figure 1:
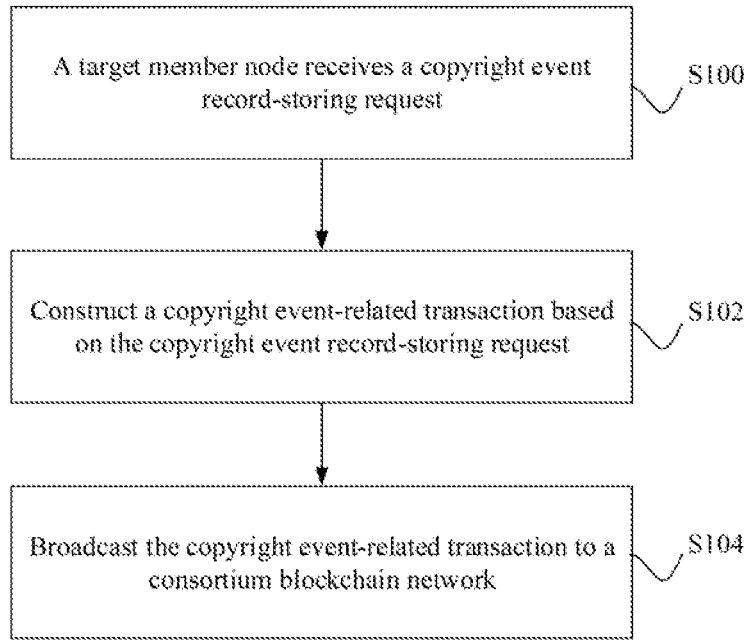
FIG. 1 is a schematic flowchart illustrating a method of storing a record of a copyright event based on a blockchain according to an implementation of the present specification.

As mentioned above, recording a copyright event by the server of a single work service provider is actually a centralized data storage method, and the centralized data storage method naturally has the drawback that the data is easily tampered with or destroyed.

In one or more implementations of the present specification, devices of several work service providers serve as member nodes to form a consortium blockchain network. As such, a work service provider corresponding to a member node in the consortium blockchain network can timely upload to the blockchain network for storing the event-related information of a copyright event monitored by the work service provider. Because data in the blockchain has the characteristics of tamper-resistance and destroying-resistance, storage records of copyright events are also tamper-resistant and destroying-resistant.

In addition, in practice, copyright events monitored by work service providers are usually generated based on work-related services operated by the work service providers. That is, copyright events that need to be stored by a certain work service provider are usually initiated by a certain user of the work service provider when using the work-related service provided by the service provider. For example, when user A of music platform A shares original music work X on music platform A, user A can further request music platform A to store the copyright event "User A created music work X". A work of authorship, referred to as a "work" for descriptive purposes, includes literary works, dramatic works including any accompanying music, musical works including any accompanying words, pantomimes and choreographic work, pictorial works, graphic works, sculptural works, motion pictures and other audiovisual works, sound recordings, architectural plans, drawings and actual buildings, other artistic works, and other works of authorship that encompass the protection domain of copyright.

In the implementations of the present specification, because a work service provider enables its own device to connect to a consortium blockchain network, the device of the work service provider can directly pack event-related information of a copyright event initiated by a user into a transaction, and broadcast the transaction to the consortium blockchain network for distributed storage. The entire storage process does not involve the user, and causes little disturbance to the user.

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

The following describes in detail the implementations of the present specification.

FIG. 1 is a schematic flowchart illustrating a method of storing a record of a copyright event based on a blockchain according to an implementation of the present specification. The method includes the following steps:

S100: A target member node receives a copyright event record-storing request.

In the implementations of the present specification, some work service providers can be specified to form a consortium blockchain network by using devices of these work service providers as member nodes. The devices of the work service providers that serve as the member nodes can be specifically servers of the work service providers that are used to perform work-related services, or can be other devices of the work service providers.

The target member node is a member node in the consortium blockchain network. The target member node can be specifically a server(s) of the work service provider that controls the target member node, or can be another device of the work service provider that controls the target member node.

In step S100, when the target member node is the server of the work service provider that controls the target member node, the copyright event record-storing request received by the target member node can be sent by a user who has registered with the target member node. When the target member node is another device of the work service provider that controls the target member node, the copyright event record-storing request received by the target member node can be sent, in response to a user request, by the server of the work service provider that controls the target member node.

The copyright event record-storing request includes event-related information of a target copyright event. The target copyright event is generated based on a work-related service of the target member node, and the work-related service of the target member node is actually a work-related service performed by the server of the work service provider that controls the target member node.

For example, the work-related service performed by the server of music platform A is to receive and publish the original music work uploaded by the user. Assume that user A uploaded original music work X to the server of music platform A on Sep. 10, 2018, the server stores the original music work and publishes it to other users. Then, a copyright event generated based on the work-related service can be "User A created original music work X at 12:00 on Sep. 10, 2018." Based on this copyright event, the server can construct and send a copyright event record-storing request to member nodes controlled by music platform A.

In the implementations of the present specification, the event-related information can specifically include information such as the occurrence time of the target copyright event, specific content of the target copyright event, and the user identifier of a user who initiates the target copyright event.

S102: Construct a copyright event-related transaction based on the copyright event record-storing request.

It should be noted that the transaction described in the present specification refers to a piece of data that is created by a user by using a blockchain client and that needs to be finally added to a distributed database of the blockchain.

That is, transactions in the blockchain include a transaction in a narrow sense and a transaction in a broad sense. A transaction in a narrow sense refers to a value transfer added by a user to the blockchain. For example, in a conventional Bitcoin blockchain network, a transaction can be a transfer initiated by a user in the blockchain. A transaction in a broad sense refers to service data that is added by a user to the blockchain and that has a service or business intention. For example, an operator can establish a consortium blockchain based on actual service needs, and deploy some other types of online services (for example, a rental service, a vehicle scheduling service, an insurance claim service, a credit service, and a medical service) that are not related to value transfer in the consortium blockchain. In such consortium blockchain, a transaction can be a service message or a service request that is added by a user to the consortium blockchain and that has a service or business intention.

Therefore, in step S102, the target member node constructs the copyright event-related transaction actually by assembling the event-related information by using a data structure agreed upon in advance in the consortium blockchain network.

S104: Broadcast the copyright event-related transaction to the consortium blockchain network.

After obtaining the copyright event-related transaction, each member node adds the copyright event-related transaction to the blockchain based on a consensus mechanism. That is, each member node stores the copyright event-related transaction in its own copy of the blockchain, which is equivalent to keeping a record of the target copyright event.

According to the copyright event record storage method shown in FIG. 1, devices of some work service providers operating work-related services can serve as member nodes to form a consortium blockchain network. Each work service provider of the consortium blockchain network broadcasts copyright events generated based on its work-related services to the consortium blockchain network, so all the work service providers of the consortium blockchain network perform blockchain-based distributed storage. Because data on the blockchain cannot be tampered with or destroyed, the security and credibility of a storage record obtained after a copyright event is stored can be ensured after the storage record is added to the blockchain.

In addition, the present disclosure provides a method for constructing a consortium blockchain network as follows:

1. A to-be-connected node invokes a deployed smart contract, the smart contract being configured to execute node connection-related logic;

2. The to-be-connected node determines, through the smart contract, whether a member node exists in the consortium blockchain network; performs step 3 and ends the procedure in response to that no member node exists in the consortium blockchain network; or jumps to step 4 in response to that a member node exists in the consortium blockchain network;

3. The to-be-connected node activates its member right through the smart contract to become a member node of the consortium blockchain network;

4. The to-be-connected node sends a connection request to the member node in the consortium blockchain network by using the smart contract;

5. Each member node in the consortium blockchain network invokes the deployed smart contract, determines, through the smart contract, whether a connection condition in the smart contract is satisfied, and returns a determining result to the to-be-connected node; and 6. In response to determining, through the smart contract, that each member node reaches a consensus that the connection condition is satisfied, the to-be-connected node activates its member right to become a member node of the consortium blockchain network.

The to-be-connected node is a device that requests to connect to the consortium blockchain network as a member node. In practice, members of the consortium blockchain network are usually selected through screening, and the screening rules usually form a smart contract. To become a member of the consortium blockchain network, a node needs to deploy the smart contract and then invoke the deployed smart contract to enter the network connecting process.

The related logic executed can be specified based on actual scenarios of the implementations. For example, assume that the consortium blockchain network needs to avoid business interest conflicts between members (for example, work-related services of two or more member nodes are highly overlapped), the smart contract should be compiled such that the smart contract can realize that in the consortium blockchain network, there are a relatively small number of member nodes whose work-related services are highly overlapped in scope.

Specifically, the smart contract provides a plurality of work types, and for each work type of the plurality of work types, the smart contract further provides a threshold and a cumulative value corresponding to a type identifier of the work type.

Different work types can be divided according to actual needs. For example, music works, literary works, painting works, and movie and television works; or compilation works, adaptation works, and translation works; or original music works, adapted music works, compiled music works, original literary works, adapted literary works, compiled literary works, and translated literary works can be set.

A connection request sent by the to-be-connected node through the smart contract needs to include at least one specified type identifier and a weight value corresponding to each specified type identifier, and a work type corresponding to each specified type identifier matches a work-related service of the to-be-connected node. For example, the work type corresponding to the specified type identifier is a music work, and the work-related service of the to-be-connected node should also include the music work-related service.

That is, the to-be-connected node needs to indicate, in the connection request, the work type involved in the work-related service it operates. For example, if the to-be-connected node is a server of video adaptation platform B, an execution type identifier in the connection request sent by the to-be-connected node is the type identifier of a video adaptation work.

The weight value corresponding to each specified type identifier can be considered as a share of interest, requested by the to-be-connected node, in a service area related to the work type of the specified type identifier after the to-be-connected node becomes a member node.

As can be seen from this, the cumulative value corresponding to each type identifier is actually a sum of weight values of all member nodes having the work-related service of the work type specified by the type identifier. The threshold corresponding to the type identifier is actually the upper limit of the sum of the weight values of all the member nodes having the work-related service of the work type of the type identifier in the consortium blockchain network.

Therefore, to avoid a large commercial interest conflict between member nodes, there can be specifically two kinds of connection conditions.

Specifically, connection condition 1 is as follows: For each specified type identifier included in the connection request, a sum of a requested weight value corresponding to the specified type identifier and a cumulative value of weight values of the existing member nodes of the specified type identifier is not greater than a threshold corresponding to the specified type identifier.

This means that to permit the to-be-connected node to become a member node, for each specified type identifier, the interest proportion requested by the to-be-connected node in a service area related to a work type of the specified type identifier may not exceed the currently remaining interest proportion in the service area related to the work type of the specified type identifier, in the consortium blockchain network.

If the above connection condition 1 is satisfied, the to-be-connected node can connect to the consortium blockchain network to become a member node.

In addition, regarding each specified type identifier included in the connection request, each member node also determines, through the smart contract, a difference between a threshold and a cumulative value of the existing member nodes of the specified type identifier; and determines, through the smart contract, whether a requested weight value corresponding to the specified type identifier is greater than the difference; in response to the requested weight value corresponding to the specified type identifier being greater than the difference, obtains, through the smart contract, an updated cumulative value to be a sum of the difference and the existing cumulative value corresponding to the specified type identifier; in response to the requested weight value corresponding to the specified type identifier not being greater than the difference, obtains, through the smart contract, an updated cumulative value to be a sum of the requested weight value corresponding to the specified type identifier and the existing cumulative value corresponding to the specified type identifier.

Connection condition 2 is as follows: For each specified type identifier included in the connection request, a sum of cumulative values corresponding to the specified type identifier is less than a threshold corresponding to the specified type identifier.

This means that if it is desired to permit the to-be-connected node to become a member node, for each specified type identifier, there is still a remaining interest proportion, in the consortium blockchain network, in a service area related to a work type of the specified type identifier.

If the above connection condition 2 is satisfied, the to-be-connected node can connect to the consortium blockchain network to become a member node. However, for each specified type identifier, a weight value requested by the to-be-connected node and corresponding to the specified type identifier is not necessarily accumulated fully into the cumulative value corresponding to the specified type identifier.

Specifically, each member node also determines, through the smart contract, a difference between a threshold and a cumulative value corresponding to each specified type identifier included in the connection request; and determines, through the smart contract, whether a requested weight value corresponding to the specified type identifier is greater than the difference; in response to the requested weight value corresponding to the specified type identifier being greater than the difference, obtains, through the smart contract, a sum of the difference and the existing cumulative value corresponding to the specified type identifier as an updated cumulative value corresponding to the specified type identifier; in response to the requested weight value corresponding to the specified type identifier not being greater than the difference, obtains, through the smart contract, a sum of the requested weight value corresponding to the specified type identifier and the existing cumulative value corresponding to the specified type identifier as the updated cumulative value corresponding to the specified type identifier.

By using the above connection condition 1 or connection condition 2, the quantity of member nodes in the service area involved in each work type can be controlled.

Figure 2:
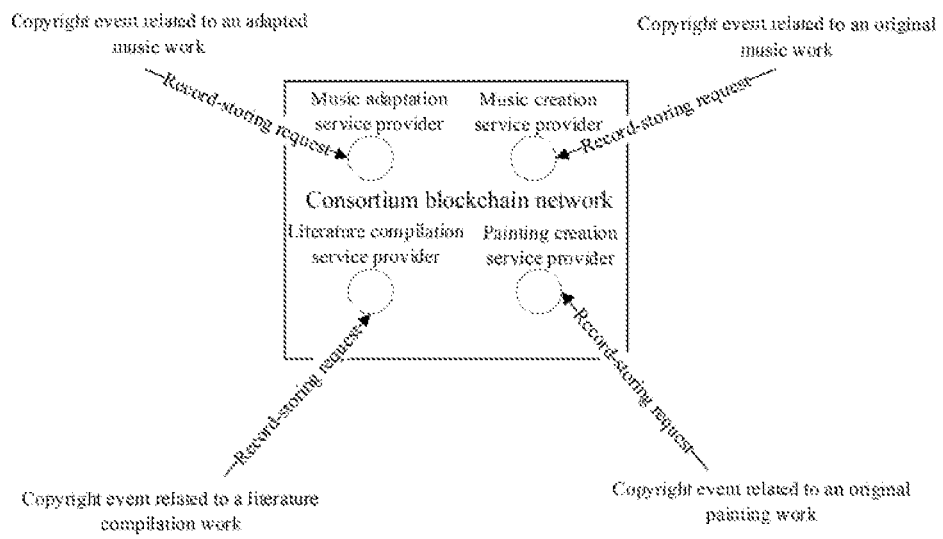
FIG. 2 is a schematic structural diagram illustrating a system of storing a record of a copyright event based on a blockchain according to an implementation of the present specification.

FIG. 2 schematically shows a system of storing a record of a copyright event based on a blockchain, including a consortium blockchain network which includes a plurality of member nodes; a target member node receives a copyright event record-storing request, a target copyright event is generated based on a work-related service of the target member node, and the work-related service of the target member node is a work-related service performed by a server of a work service provider that controls the target member node; constructs a transaction related to the target copyright event based on the request; and broadcasts the transaction to the consortium blockchain network; and each member node adds the copyright event-related transaction to the blockchain based on a consensus mechanism.

As shown in FIG. 2, a work service provider that controls each member node in the consortium blockchain network can operate different work-related services. A member node controlled by each work service provider is usually responsible for accepting record-storing requests for copyright events of a work type that matches a work-related service the work service provider operates.

Figure 3:
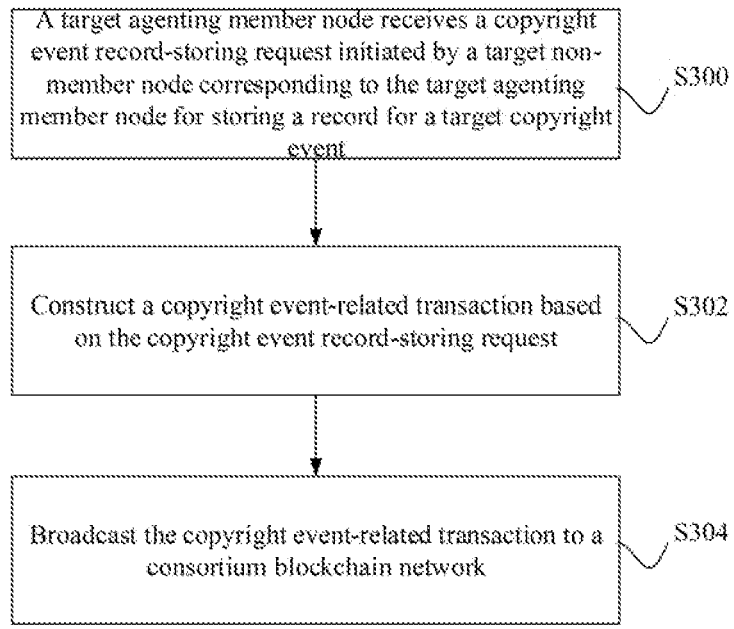
FIG. 3 is a schematic flowchart illustrating a method of storing a record of a copyright event in a blockchain through an agent according to an implementation of the present specification.

FIG. 3 shows a blockchain-based method of recording a copyright event through an agent according to implementations of the present specification. The method includes the following steps:

S300: A target agenting member node receives a copyright event record-storing request initiated by a target non-member node corresponding to the target agenting member node for storing a record for a target copyright event.

In the implementations of the present specification, the member nodes of a consortium blockchain network include at least one agenting member node; each agenting member node has a right to provide agenting for a non-member node corresponding to the agenting member node on recording copyright events.

The non-member node corresponding to the agenting member node can be a non-root node in a tree structure of nodes, in which the agenting member node is the root node.

It should be noted that the tree structure described herein mainly refers to a tree structure relationship, but does not mean that multiple nodes are distributed in a tree structure.

That is, an agenting member node can be connected to multi-level non-member nodes, and agent copyright event record storage events initiated by the connected non-member nodes.

Figure 4:
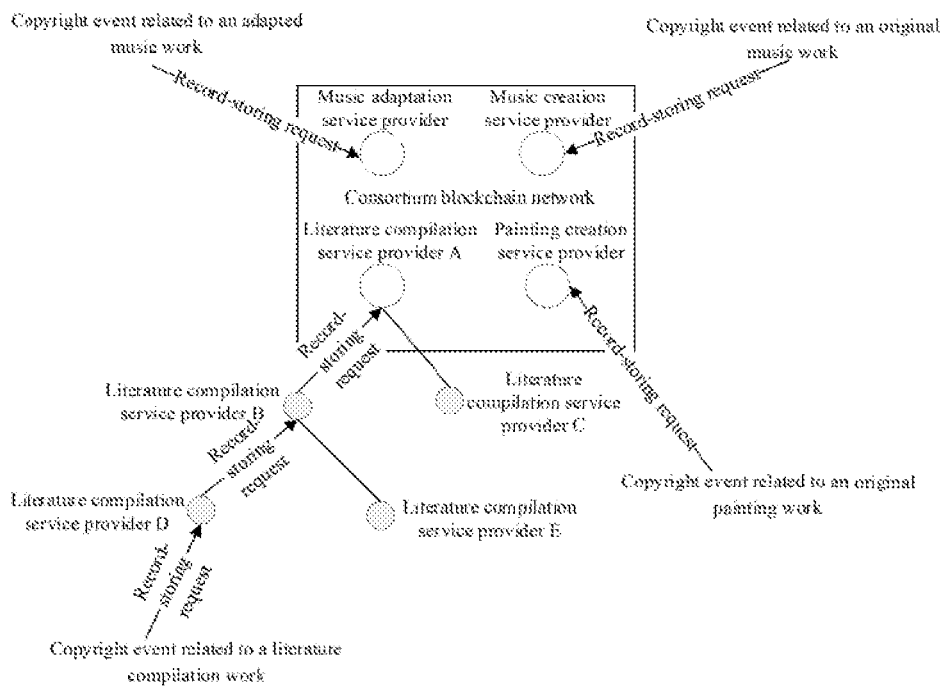
FIG. 4 is a schematic structural diagram illustrating blockchain-based system of recording a copyright event through an agent according to an implementation of the present specification.

FIG. 4 is a schematic structural diagram illustrating a blockchain-based system of recording a copyright event through an agent according to an implementation of the present specification. As shown in FIG. 4, a member node controlled by literature compilation service provider A is an agenting member node. Member node A correspond to non-member nodes B, C, D and E, which are respectively non-member nodes controlled by literature compilation service providers B, C, D and E. Non-member node D controlled by literature compilation service provider D can receive a record-storing request sent by the server of the literature compilation service provider, and then non-member D can first send the record-storing request to non-member node B. Then non-member node B sends the record-storing request to member node A. Then member node A constructs a copyright-related transaction based on the record-storing request for broadcasting.

In step S200, the copyright event record-storing request includes event-related information of a target copyright event. It should be noted that the copyright event record-storing request is transmitted through a target path between the target non-member node and the target agenting member node in the tree structure. Referring to FIG. 4, the path between target non-member node D and member node A is D-B-A through which the copyright event record-storing request is transmitted to member node A.

The target copyright event is generated based on a work-related service of the target non-member node, and the work-related service of the target non-member node is a work-related service performed by the server of the work service provider that controls the target non-member node. Referring to FIG. 4, the copyright event record-storing request is actually sent by the server of the work service provider that controls target non-member node D.

Further, a parent node on the target path receives a copyright event record-storing request transmitted by a specified child node based on a pre-configured storage permission type corresponding to the specified child node, the specified child node being a child node of the parent node on the target path.

That is, on the target path, each parent node performs storage permission control on its child nodes.

For example, a certain parent node has three child nodes, and a storage permission control type of each child node in the parent node can be pre-configured as shown in Table 1 below:

TABLE 1

| Child node A | Storage allowed | The acceptance priority is medium |
| Child node B | Storage not allowed | Null |
| Child node C | Storage allowed | The acceptance priority is high |

As shown in Table 1, child node B transmits a copyright event record-storing request to the parent node, which is rejected by the parent node, resulting in a storage failure. If both child node A and child node C transmit the copyright event record-storing request to the parent node, the parent node preferentially accepts the copyright event record-storing request of child node C.

S302: Construct a copyright event-related transaction based on the copyright event record-storing request.

S304: Broadcast the copyright event-related transaction to the consortium blockchain network.

For steps S302 and S304, please refer to the previous description. Details are omitted herein for simplicity.

In addition, in the implementations of the present specification, for each agenting member, a work-related service of the agenting member node can be set to be consistent with a work-related service of a non-member node corresponding to the agenting member node. That is, the work-related service of the non-member node corresponding to the agenting member node also belongs to the work-related service of the agenting member node.

In addition, in the implementations of the present specification, the target agenting member node can further receive a copyright event record query request initiated by the target non-member node, where the copyright event record query request is transmitted via the target path. Then the target agenting member node can return a query result based on the copyright event record query request to transmit the query result to the target non-member node via the target path. It should be noted herein that the copyright event record query request is actually a request to query a copyright event record on the blockchain.

Further, a parent node on the target path receives a copyright event record query request transmitted by a specified child node based on a pre-configured query permission type corresponding to the specified child node, the specified child node being a child node of the parent node on the target path.

That is, on the target path, each parent node performs query permission control on its child nodes.

For example, a certain parent node has three child nodes, and a query permission control type of each child node in the parent node can be pre-configured as shown in Table 2 below:

TABLE 2

| Child node A | Query allowed | The acceptance priority is medium |
| Child node B | Query not allowed | Null |
| Child node C | Query allowed | The acceptance priority is high |

As shown in Table 2, child node B transmits a copyright event record query request to the parent node, which is rejected by the parent node, resulting in a query failure. If both child node A and child node C transmit the copyright event record query request to the parent node, the parent node preferentially accepts the copyright event record query request of child node C.

In addition, in the implementations of the present specification, a work service provider of a certain agenting member node can agree on some cooperation rules with a work service provider of a non-member node corresponding to the agenting member node. For example, as shown in FIG. 4, literature compilation service provider A agents copyright event record storage for literature compilation service provider D, and thereby can charge a certain agency fee.

In addition, the structure of the blockchain-based system of recording a copyright event through an agent shown in FIG. 4 needs to be described.

The blockchain-based system of recording a copyright event through an agent includes a consortium blockchain network and a plurality of non-member nodes. The consortium blockchain network includes a plurality of member nodes, and the plurality of member nodes include at least one agenting member node; each agenting member node has a right to agent copyright event record storage for a non-member node corresponding to the agenting member node.

A target agenting member node receives a copyright event record-storing request initiated by a target non-member node corresponding to the target agenting member node for storing a record for a target copyright event, where the target copyright event is generated based on a work-related service of the target non-member node, and the work-related service of the target non-member node is a work-related service performed by the server of the work service provider that controls the target non-member node; constructs a transaction related to the target copyright event based on the request; and broadcasts the transaction to the consortium blockchain network; and each member node adds the copyright event-related transaction to the blockchain based on a consensus mechanism.

Figure 5:
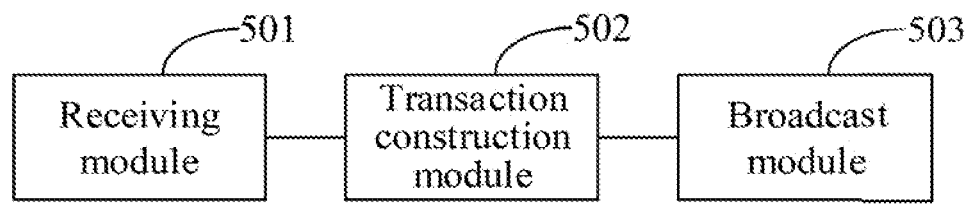
FIG. 5 is a schematic structural diagram illustrating an apparatus of storing a record of a copyright event based on a blockchain according to an implementation of the present specification.

Based on the method of storing a record of a copyright event based on a blockchain shown in FIG. 1, an implementation of the present specification further correspondingly provides an apparatus of storing a record of a copyright event based on a blockchain. As shown in FIG. 5, a consortium blockchain network includes a plurality of member nodes, the apparatus is a member node, and the apparatus includes: a receiving module 501, configured to receive a request for storing a record for a target copyright event, the target copyright event being generated based on a work-related service of the target member node, and the work-related service of the target member node being a work-related service performed by a server of a work service provider that controls the target member node; a transaction construction module 502, configured to construct a transaction related to the target copyright event based on the request; and a broadcasting module 503, configured to broadcast the transaction to the consortium blockchain network for each member node to add the copyright event-related transaction to the blockchain based on a consensus mechanism. The apparatus also includes a consensus module that adds the copyright event-related transaction to the respective copy of the blockchain upon a verification and validation process is successfully completed on the copyright event-related transaction based on the consensus mechanism.

Figure 6:
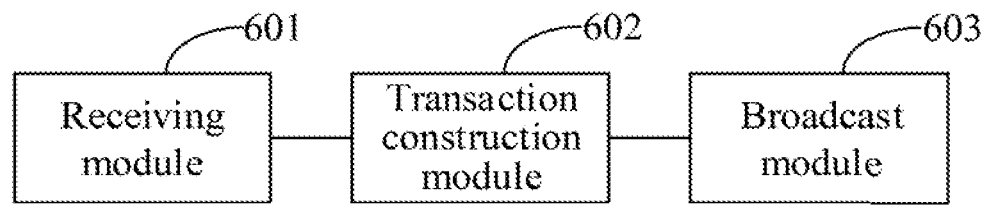
FIG. 6 is a schematic structural diagram illustrating a blockchain-based apparatus of recording a copyright event through an agent according to an implementation of the present specification.

Based on the blockchain-based method of recording a copyright event through an agent shown in FIG. 3, an implementation of the present specification further correspondingly provides a blockchain-based apparatus of recording a copyright event through an agent. As shown in FIG. 6, a consortium blockchain network includes a plurality of member nodes, the plurality of member nodes include at least one apparatus, and the apparatus has a right to agent copyright event record storage for a non-member node of the apparatus.

The apparatus includes: a receiving module 601, configured to receive a copyright event record-storing request initiated by a target non-member node of the apparatus, a target copyright event being generated based on a work-related service of the target non-member node, and the work-related service of the target non-member node being a work-related service performed by a server of a work service provider that controls the target non-member node; a transaction construction module 602, configured to construct a transaction related to the target copyright event based on the request; and a broadcasting module 603, configured to broadcast the transaction to the consortium blockchain network for each member node to add the copyright event-related transaction to the blockchain based on a consensus mechanism. The apparatus also includes a consensus module that adds the copyright event-related transaction to the respective copy of the blockchain upon a verification and validation process is successfully completed on the copyright event-related transaction based on the consensus mechanism.

An implementation of the present specification further provides a computer device. The computer device includes at least a memory, a processor, and a computer program that is stored in the memory and that can run on the processor. When executing the program, the processor implements the functions of the methods in one or more of FIG. 1 and FIG. 3.

Figure 7:
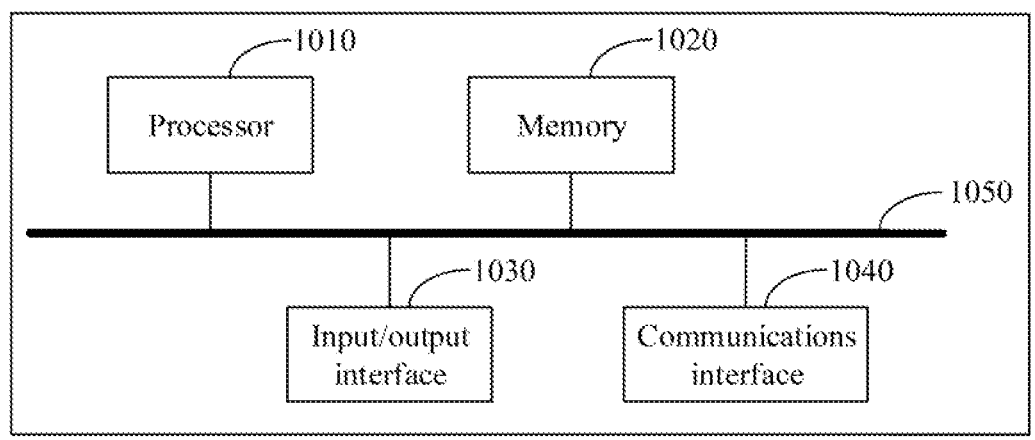
FIG. 7 is a schematic structural diagram illustrating a computer device used to configure a method in an implementation of the present specification.

FIG. 7 is a more detailed schematic diagram illustrating a hardware structure of a computing device according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to be connected to an input/output module, to input or output information. The input/output module (not shown in the figure) can be used as a component and configured in the device, or can be externally connected to the device to provide a corresponding function. The input device can include a keyboard, a mouse, a touchscreen, a microphone, various sensors, etc. The output device can include a monitor, a speaker, a vibrator, an indicator, etc.

The communications interface 1040 is configured to be connected to a communications module (not shown in the figure), to implement a communication interaction between the device and another device. The communications module can perform communication in a wired method (for example, USB or a network cable), or can perform communication in a wireless method (for example, a mobile network, Wi-Fi, or Bluetooth).

The bus 1050 includes one channel, used to transmit information between components (for example, the processor 1010, the memory 1020, the input/output interface 1030, and the communications interface 1040) of the device.

It should be noted that although only the processor 1010, the memory 1020, the input/output interface 1030, the communications interface 1040, and the bus 1050 of the device are shown, in an example implementation, the device can further include other components needed for implementing normal running. In addition, a person skilled in the art can understand that the device can include only components necessary for implementing the solutions in the implementations of the present specification, but does not necessarily include all components shown in the figure.

An implementation of the present specification further provides a computer readable storage medium. The computer readable storage medium stores a computer program. When executing the program, a processor implements the functions of the methods in one or more of FIG. 1 and FIG. 3.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 8:
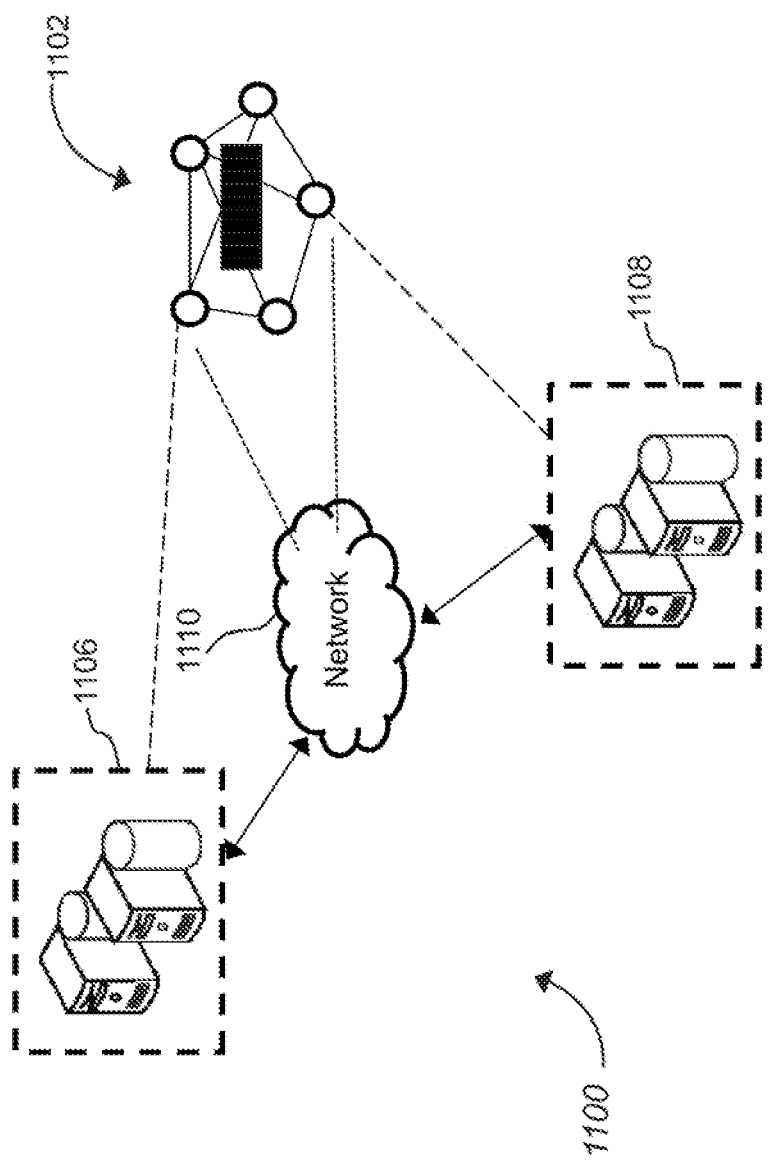
FIG. 8 is a diagram illustrating example environments that can be used to execute embodiments of this specification.

FIG. 8 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 8, the consortium blockchain network 1102 is represented as a peer-to-peer network of nodes, and the computing systems 1106, 1108 provide nodes of the first entity and second entity, respectively, which participate in the consortium blockchain network 1102.

Figure 9:
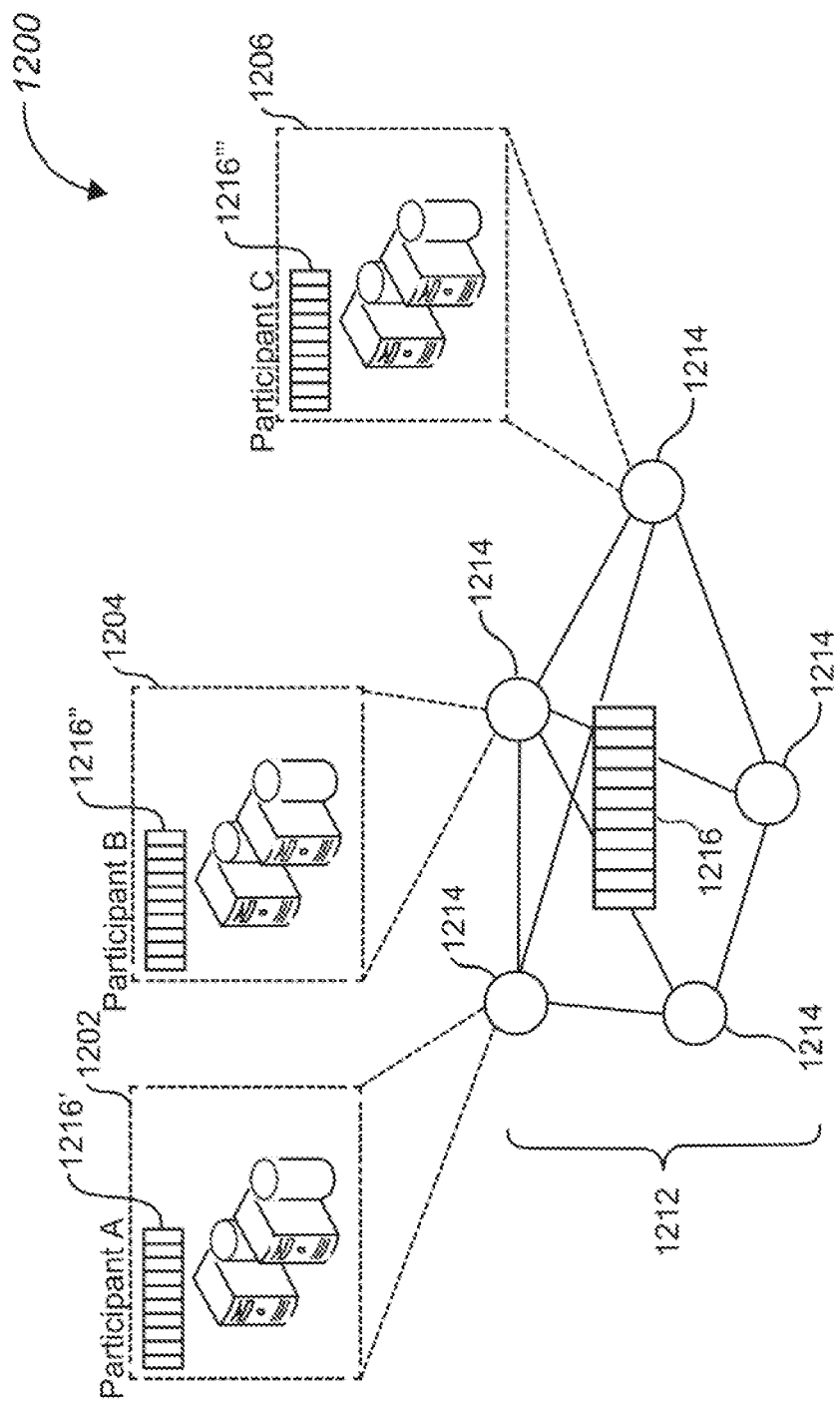
FIG. 9 is a diagram illustrating an example architecture in accordance with embodiments of this specification.

FIG. 9 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 9, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 2, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 9, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 9, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 9, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

It can be understood from the descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to execute the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of at least two of these devices.

The implementations of the present specification are described in a progressive method. For same or similar parts of the implementations, references can be made to the implementations. Each implementation focuses on a difference from other implementations. For example, the apparatus and device implementations are similar to the method implementation, and therefore are described briefly. For related parts, references can be made to the descriptions in the method implementation. The method implementation described above is merely an example. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions in the implementations. A person of ordinary skill in the art can understand and implement the implementations of the present application without creative efforts.

The previous descriptions are merely example implementations of the implementations of the present application. It should be noted that a person of ordinary skill in the art can further make several improvements or polishing without departing from the principles of the implementations of the present specification, and the improvements or polishing shall fall within the protection scope of the implementations of the present specification.

What is claimed is:

1. A method, comprising:
 constructing a consortium blockchain network through acts including:
  invoking, by a to-be-connected node, a smart contract;
  determining, by the to-be-connected node, through the smart contract, whether a member node exists in the consortium blockchain network;
  in response to no member node existing in the consortium blockchain network, activating, by the to-be-connected node, membership right of the to-be-connected node through the smart contract to become a member node of the consortium blockchain network;
  in response to at least one member node existing in the consortium blockchain network, sending, by the tobe-connected node, a connection request to the at least one existing member node in the consortium blockchain network by using the smart contract;

invoking, by each of the at least one existing member node in the consortium blockchain network, the smart contract, to determine, through the smart contract, whether a connection condition in the smart contract is satisfied with respect to the to-be-connected node; and in response to determining, through the smart contract, that each of the at least one existing member node reaches a consensus that the connection condition is satisfied, activating, by the to-be-connected node, the membership right of the to-be-connected node to become a member node of the consortium blockchain network;

receiving, by a target member node of the consortium blockchain network, a request for storing a record for a target copyright event in a blockchain, the target copyright event corresponding to a service on a work of authorship performed by a server of a work service provider that controls the target member node;

constructing a transaction related to the target copyright event based on the request;

broadcasting the transaction to member nodes of the consortium blockchain network for each member node to add the transaction to a respective copy of the blockchain based on a consensus mechanism of the consortium blockchain network; and adding the transaction to a copy of the blockchain stored at the target member node based on the consensus mechanism.

2. The method according to claim 1, wherein, the smart contract provides a plurality of work types, and for each work type of the plurality of work types, the smart contract provides a type identifier and a threshold and a cumulative value corresponding to the type identifier;

the connection request includes a first type identifier and a first weight value corresponding to the first type identifier;

the connection condition includes:
for the first type identifier included in the connection request, a sum of the first weight value and a first cumulative value corresponding to the first type identifier being not greater than a first threshold corresponding to the first type identifier; and in response to the connection condition being satisfied, the constructing the consortium blockchain network includes:
for the first type identifier included in the connection request, obtaining, by each member node through the smart contract, the sum of the first weight value and the first cumulative value as an updated cumulative value corresponding to the first type identifier.

3. The method according to claim 1, wherein, the smart contract provides a plurality of work types, and for each work type, the smart contract provides a type identifier and a threshold and a cumulative value corresponding to the type identifier of the work type;

the connection request includes a first type identifier and a first weight value corresponding to the first type identifier;

the connection condition includes:
for the first type identifier included in the connection request, a first cumulative value corresponding to the first type identifier is less than a first threshold corresponding to the first type identifier; and in response to the connection condition being satisfied, the constructing the consortium blockchain network includes:
determining, by each member node through the smart contract, a difference between the first threshold and the first cumulative value corresponding to the first type identifier;

determining, through the smart contract, whether the first weight value is greater than the difference;

in response to the first weight value being greater than the difference, obtaining, through the smart contract, a sum of the difference and the first cumulative value as an updated cumulative value corresponding to the first type identifier; and in response to the first weight value not being greater than the difference, obtaining, through the smart contract, a sum of the first weight value and the first cumulative value as the updated cumulative value corresponding to the first type identifier.

4. The method of claim 2, wherein the cumulative value corresponding to the type identifier of each work type is a sum of weight values of member nodes that exist in the consortium blockchain network for the work type.

5. An apparatus of a first member node of a consortium blockchain network, the consortium blockchain network having a plurality of member nodes including the first member node, the apparatus comprising a processor and a memory, the memory storing computer executable instructions that are executed by the processor to implement:

a receiving module that receives a request for storing a record for a target copyright event in a blockchain, the target copyright event corresponding to a service on a work of authorship performed by a server of a work service provider that controls the target member node;

a transaction construction module that constructs a transaction related to the target copyright event based on the request; and a broadcasting module that broadcasts the transaction to member nodes of the consortium blockchain network for each member node to add the transaction to a respective copy of the blockchain based on a consensus mechanism of the consortium blockchain network, wherein the consortium blockchain network is constructed through acts including:

invoking, by a to-be-connected node, a smart contract;

determining, by the to-be-connected node through the smart contract, whether a member node exists in the consortium blockchain network;

in response to no member node existing in the consortium blockchain network, activating, by the to-be-connected node, membership right of the to-be-connected node through the smart contract to become a member node of the consortium blockchain network;

in response to at least one member node existing in the consortium blockchain network, sending, by the to-be-connected node, a connection request to the at least one existing member node in the consortium blockchain network by using the smart contract;

invoking, by each of the at least one existing member node in the consortium blockchain network, the smart contract, to determine, through the smart contract, whether a connection condition in the smart contract is satisfied with respect to the to-be-connected node; and in response to determining, through the smart contract, that each of the at least one existing member node reaches a consensus that the connection condition is satisfied, activating, by the to-be-connected node, the membership right of the to-be-connected node to become a member node of the consortium blockchain network.

6. The apparatus according to claim 5, wherein,
the smart contract provides a plurality of work types, and for each work type of the plurality of work types, the smart contract provides a type identifier and a threshold and a cumulative value corresponding to the type identifier;
the connection request includes a first type identifier and a first weight value corresponding to the first type identifier;
the connection condition includes:
  for the first type identifier included in the connection request, a sum of the first weight value and a first cumulative value corresponding to the first type identifier is not greater than a first threshold corresponding to the first type identifier; and
in response to the connection condition being satisfied, the constructing the consortium blockchain network includes:
  for the first type identifier included in the connection request, obtaining, by each member node through the smart contract, the sum of the first weight value and the first cumulative value corresponding to the first type identifier as an updated cumulative value corresponding to the first type identifier.

7. The apparatus according to claim 5, wherein,
the smart contract provides a plurality of work types, and for each work type, the smart contract provides a type identifier and a threshold and a cumulative value corresponding to the type identifier;
the connection request includes a first type identifier and a first weight value corresponding to the first type identifier;
the connection condition includes:
  for the first type identifier included in the connection request, a first cumulative value corresponding to the first type identifier is less than a first threshold corresponding to the first type identifier; and
in response to the connection condition being satisfied, the constructing the consortium blockchain network includes:
  for the first type identifier included in the connection request, determining, by each member node through the smart contract, a difference between the first threshold and the first cumulative value corresponding to the first type identifier;
  determining, through the smart contract, whether the first weight value is greater than the difference;
  in response to the first weight value being greater than the difference, obtaining, through the smart contract, a sum of the difference and the first cumulative value as an updated cumulative value corresponding to the first type identifier; and
  in response to the first weight value not being greater than the difference, obtaining, through the smart contract, a sum of the first weight value and the first cumulative value as the updated cumulative value corresponding to the first type identifier.

8. The apparatus of claim 6, wherein the cumulative value corresponding to the type identifier of each work type is a sum of weight values of member nodes that exist in the consortium blockchain network for the work type.

9. A system, comprising a consortium blockchain network having a plurality of member nodes of computing devices,
  wherein the system constructs the consortium blockchain network through acts including:
    invoking, by a to-be-connected node, a smart contract deployed on the system;
    determining, by the to-be-connected node, through the smart contract, whether a member node exists in the consortium blockchain network;
    in response to no member node existing in the consortium blockchain network, activating, by the to-be-connected node, membership right of the to-be-connected node through the smart contract to become a member node of the consortium blockchain network;
    in response to at least one member node existing in the consortium blockchain network, sending, by the to-be-connected node, a connection request to the at least one existing member node in the consortium blockchain network by using the smart contract;
    invoking, by each of the at least one existing member node in the consortium blockchain network, the smart contract, to determine, through the smart contract, whether a connection condition in the smart contract is satisfied with respect to the to-be-connected node; and
    in response to determining, through the smart contract, that each of the at least one existing member node reaches a consensus that the connection condition is satisfied, activating, by the to-be-connected node, the membership right of the to-be-connected node to become a member node of the consortium blockchain network, and
  wherein in operation:
    a target member node of the plurality of member nodes receives a request for storing a record for a target copyright event generated based on a work-related service performed by a server of a work service provider that controls the target member node; constructs a transaction related to the target copyright event based on the request; and broadcasts the transaction to member nodes of the consortium blockchain network; and
    each member node of the consortium blockchain network adds the transaction to a blockchain based on a consensus mechanism of the consortium blockchain network.

10. The system according to claim 9, wherein,
the smart contract provides a plurality of work types, and for each work type of the plurality of work types, the smart contract provides a type identifier and a threshold and a cumulative value corresponding to the type identifier;
the connection request includes a first type identifier and a first weight value corresponding to the first type identifier;
the connection condition includes:
  for the first type identifier included in the connection request, a sum of the first weight value and a first cumulative value corresponding to the first type identifier being not greater than a first threshold corresponding to the first type identifier; and
in response to the connection condition being satisfied, the constructing the consortium blockchain network includes:
  for the first type identifier included in the connection request, obtaining, by each member node through the smart contract, the sum of the first weight value and the first cumulative value as an updated cumulative value corresponding to the first type identifier.

11. The system according to claim 9, wherein the smart contract provides a plurality of work types, and for each work type, the smart contract provides a type identifier and a threshold and a cumulative value corresponding to the type identifier;
the connection request includes a first type identifier of the plurality of type identifiers and a first weight value corresponding to the first type identifier;
the connection condition includes:
for the first type identifier included in the connection request, a first cumulative value corresponding to the first type identifier is less than a first threshold corresponding to the first type identifier; and
in response to the connection condition being satisfied, the constructing the consortium blockchain network includes:
determining, by each member node through the smart contract, a difference between the first threshold and the first cumulative value corresponding to the first type identifier;
determining, through the smart contract, whether the first weight value is greater than the difference;
in response to the first weight value being greater than the difference, obtaining, through the smart contract, a sum of the difference and the first cumulative value as an updated cumulative value corresponding to the first type identifier; and
in response to the first weight value not being greater than the difference, obtaining, through the smart contract, a sum of the first weight value and the first cumulative value as the updated cumulative value corresponding to the first type identifier.

12. The system according to claim 10, wherein the cumulative value corresponding to the type identifier of each work type is a sum of weight values of member nodes that exist in the consortium blockchain network for the work type.

13. A computer device, comprising a memory, a processor, and a computer program that is stored in the memory and executable by the processor, and the processor implementing acts when executing the program, the acts including:
constructing a consortium blockchain network that includes:
invoking, by a to-be-connected node, a smart contract;
determining, by the to-be-connected node, through the smart contract, whether a member node exists in the consortium blockchain network;
in response to no member node existing in the consortium blockchain network, activating, by the to-be-connected node, membership right of the to-be-connected node through the smart contract to become a member node of the consortium blockchain network;
in response to at least one member node existing in the consortium blockchain network, sending, by the to-be-connected node, a connection request to the at least one existing member node in the consortium blockchain network by using the smart contract;
invoking, by each of the at least one existing member node in the consortium blockchain network, the smart contract, to determine, through the smart contract, whether a connection condition in the smart contract is satisfied with respect to the to-be-connected node; and
in response to determining, through the smart contract, that each of the at least one existing member node reaches a consensus that the connection condition is satisfied, activating, by the to-be-connected node, the membership right of the to-be-connected node to become a member node of the consortium blockchain network;
receiving, at a target member node of the consortium blockchain network, a request for storing a record for a target copyright event in a blockchain, the target copyright event corresponding to a service on a work of authorship performed by a server of a work service provider that controls the target member node;
constructing a transaction related to the target copyright event based on the request;
broadcasting the transaction to member nodes of the consortium blockchain network for each member node to add the transaction to respective copy of the blockchain based on a consensus mechanism of the consortium blockchain network; and
adding the transaction to a copy of the blockchain stored at the target member node based on the consensus mechanism.

14. The computer device according to claim 13, wherein, the smart contract provides a plurality of work types, and for each work type of the plurality of work types, the smart contract provides a type identifier and a threshold and a cumulative value corresponding to the type identifier;
the connection request includes a first type identifier and a first weight value corresponding to the first type identifier;
the connection condition includes:
for the first type identifier included in the connection request, a sum of the first weight value and a first cumulative value corresponding to the first type identifier being not greater than a first threshold corresponding to the first type identifier; and
in response to the connection condition being satisfied, the constructing the consortium blockchain network includes:
for the first type identifier included in the connection request, obtaining, by each member node through the smart contract, the sum of the first weight value and the first cumulative value as an updated cumulative value corresponding to the first type identifier.

15. The computer device according to claim 13, wherein the smart contract provides a plurality of work types, and for each work type, the smart contract provides a type identifier and a threshold and a cumulative value corresponding to the type identifier;
the connection request includes a first type identifier of the plurality of type identifiers and a first weight value corresponding to the first type identifier;
the connection condition includes:
for the first type identifier included in the connection request, a first cumulative value corresponding to the first type identifier is less than a first threshold corresponding to the first type identifier; and
in response to the connection condition being satisfied, the constructing the consortium blockchain network includes:
determining, by each member node through the smart contract, a difference between the first threshold and the first cumulative value corresponding to the first type identifier;

determining, through the smart contract, whether the first weight value is greater than the difference;

in response to the first weight value being greater than the difference, obtaining, through the smart contract, a sum of the difference and the first cumulative value as an updated cumulative value corresponding to the first type identifier; and in response to the first weight value not being greater than the difference, obtaining, through the smart contract, a sum of the first weight value and the first cumulative value as the updated cumulative value corresponding to the first type identifier.

16. The computer device according to claim 14, wherein the cumulative value corresponding to the type identifier of each work type is a sum of weight values of member nodes that exist in the consortium blockchain network for the work type.

17. The method according to claim 1, wherein the constructing the transaction related to the target copyright event includes assembling information of the target copyright event using a data structure provided by the consortium blockchain network.

18. The apparatus according to claim 5, wherein the transaction construction module constructs the transaction related to the target copyright event by assembling information of the target copyright event using a data structure provided by the consortium blockchain network.

19. The system according to claim 9, wherein the target member node constructs a transaction related to the target copyright event by assembling information of the target copyright event using a data structure provided by the consortium blockchain network.

20. The computer device according to claim 13, wherein the constructing the transaction related to the target copyright event includes assembling information of the target copyright event using a data structure provided by the consortium blockchain network.

* * * * *